United States Patent [19]
Leitner et al.

[11] Patent Number: 5,587,575
[45] Date of Patent: Dec. 24, 1996

[54] IDENTIFICATION OF VEHICLES INCLUDING CODE COMPARISON

[75] Inventors: Johann R. Leitner; Anthony Farah, both of Gauteng, South Africa

[73] Assignee: Spescom (Proprietary) Limited, Gauteng, South Africa

[21] Appl. No.: 512,655

[22] Filed: Aug. 8, 1995

[30] Foreign Application Priority Data

Aug. 11, 1994 [ZA] South Africa ............................ 94/6046
Dec. 15, 1994 [ZA] South Africa ............................ 94/10029

[51] Int. Cl.⁶ ................................................ G07B 15/02
[52] U.S. Cl. ........................ 235/384; 235/462; 235/470; 235/375
[58] Field of Search ........................... 235/375, 380, 235/384, 448, 470, 472, 462

[56] References Cited

U.S. PATENT DOCUMENTS

| | | | |
|---|---|---|---|
| 4,295,039 | 10/1981 | Stuckert | 235/380 |
| 4,368,979 | 1/1983 | Ruell | 250/271 |
| 4,630,201 | 12/1986 | White | 235/379 X |
| 4,908,500 | 3/1990 | Baumberger et al. | 235/384 |
| 4,958,064 | 9/1990 | Kirkpatrick | 235/384 |
| 4,970,389 | 11/1990 | Danforth et al. | 250/271 |
| 4,982,070 | 1/1991 | Bezin et al. | 235/384 X |
| 5,365,050 | 11/1994 | Worthington et al. | 235/472 |
| 5,367,572 | 11/1994 | Weiss | 235/379 X |
| 5,386,106 | 1/1995 | Kumar | 235/472 X |
| 5,396,233 | 3/1995 | Hofmann | 235/384 X |
| 5,422,473 | 6/1995 | Kamata | 235/384 |
| 5,436,437 | 7/1995 | Ho | 235/384 |

FOREIGN PATENT DOCUMENTS 4062693  2/1992  Japan .

*Primary Examiner*—Donald T. Hajec
*Assistant Examiner*—Michael G. Lee
*Attorney, Agent, or Firm*—Abelman, Frayne & Schwab

[57] ABSTRACT

The system 10 for identifying a vehicle includes a code generator 12 which generates a code in response to the provision of predetermined data relating to features of the vehicle. The code is generated on a slip of paper which is affixed to the vehicle. A number of code readers 14 is provided for reading the code, decrypting the code and extracting information relating to the features of the vehicle from the code to determine whether or not the code applies to that vehicle.

20 Claims, 2 Drawing Sheets

5,587,575

IDENTIFICATION OF VEHICLES INCLUDING CODE COMPARISON

BACKGROUND OF THE INVENTION

This invention relatates to the identification of vehicles. More particularly, the invention relates to a method of, and system for, identifying a vehicle.

SUMMARY OF THE INVENTION

According to a first aspect of the invention, there is provided a method of identifying a vehicle which includes the steps of scanning a code attached to the vehicle, the code being humanly discernible and visibly mounted on the vehicle and the code including encrypted data relating to features of the vehicle;

decrypting the code to extract therefrom the data relating to said features of the vehicle; and comparing the data decrypted from the code with the features of the vehicle to determine whether or not the code applies to the vehicle to which it is attached.

By "humanly discernible" is meant, unless the context clearly indicates otherwise, that the code can at least be seen by a person, it not being necessary for the code to be humanly intelligible.

In addition to the features of the vehicle, the code may include data relating to a personal identification number (PIN) and the method may then include comparing the PIN given by a driver of the vehicle with the PIN decrypted from the code. Thus, the method may include effecting a comparison of the PIN decrypted from the code with the PIN provided by the driver and providing an indication of the match of the two PIN's without displaying in any way the PIN decrypted from the code.

Further, the code may include data relating to a predetermined additional identifying device and the method may include comparing the identifying device given by the driver of the vehicle with the identifying device decrypted from the code. Once again, the method may include effecting a comparison of the identifying device decrypted from the code with the identifying device provided by the driver and providing an indication of the match of the two identifying devices without displaying in any way the name decrypted from the code. The additional identifying device may be a name of an owner or authorized user of the vehicle The method may include, initially, providing the required data related to the features of the vehicle, the PIN and the predetermined identifying device, encrypting the data into the code and generating the code in a suitable format.

It will be appreciated that the features of the vehicle would be provided to an authority, for example, a licensing authority who would then generate the code and provide the code to an authorized operator of the vehicle. The features of the vehicle may include the make, model, colour, year of manufacture, year of registration, registration number, etc.

The method may include compressing at least certain of the data prior to encryption.

The method may include generating the code as a string of alpha-numeric characters. In addition, or instead, the method may include generating the code in a bar code format.

According to a second aspect of the invention, there is provided a system for identifying a vehicle, the system including a code-generating means for generating a code in response to the provision of predetermined data relating to features of the vehicle and for supplying a person with the code in a humanly discernible format, the code including data therein representative of the features of the vehicle; and a code reading means for decrypting the code to extract therefrom the predetermined data relating to the features of the vehicle to determine whether or not the code applies to the vehicle to which it is attached, in use.

The code may be in the form of a string of alpha-numeric characters. In addition, or instead, the code may be in the form of a bar code. Thus, the code reading means may include an entering means for entering the code to enable the code to be read and decrypted. In the case of the code being in the form of a string of alpha-numeric characters, the entering means may be in the form of a keypad. In the case of the code being in the form of a bar code, the entering means may be in the form of a bar code reader such as, for example, a wand.

The features of the vehicle embodied in the code may include physical characteristics of the vehicle as well as identifying characteristics of the vehicle. For example, the physical characteristics may include the make and model of the vehicle and its colour, etc. The identifying characteristics may include a vehicle identification number of the vehicle, the chassis number, its engine number, etc.

The code may also embody data relating to a personal identification number (PIN), either of the vehicle or of an operator of the vehicle. Additionally, the code may further embody data relating to an additional identifying device, for example, the name of an owner or authorized user of the vehicle, when required to do so, the driver of the vehicle provides details of the PIN and/or name to the relevant personnel. Details of the PIN and/or the name are entered into the code reading means. When the code is decrypted, the details of the PIN and/or the name which have been entered are compared with details of the PIN and/or the name decrypted from the code, the comparison being effected by the code reading means. If there is a match or only minor discrepancies, an acceptance of the provided PIN and/or name is indicated by the code reading means. If not, rejection of the PIN and/or name provided is indicated by the code reading means.

Hence, the code generating means may comprise a microprocessor having a memory means in which a crypro-algorithm is stored. Thus, in use, upon the provision of details of the features of the vehicle to the authority providing the code, such details are entered into the microprocessor and the crypro-algorithm encrypts the details into the code.

Likewise, the code reading means may include a microprocessor having a memory means in which a crypro-algorithm is stored for decrypting the code read from the vehicle. The microprocessor may further include a comparator for comparing information made available by a driver of the vehicle relating to the PIN and the additional identifying device. A display means may be connected to the microprocessor for displaying information relating to the features of the vehicle to ascertain whether or not the code attached to the vehicle indeed relates to that vehicle.

Where details of the PIN or name are provided by a driver of the vehicle, it is not necessary for the details of the PIN or name decrypted from the code to be displayed. It will be appreciated that all that is required is that a comparison must be made between the PIN's or names, as the case may be, in order for there to be acceptance or rejection thereof. Hence, it will not be necessary for the name of the owner or authorized user of the vehicle to be known to the personnel using the code reading means, the driver of the vehicle keying in the relevant information.

Certain jurisdictions have introduced or are going to introduce a national vehicle classification (NVC) code as a standard. The NVC comprises a string of alpha-numeric characters containing particulars of the vehicle. The string of alpha-numeric characters is not generated by way of any encryption technique. In the NVC code, particular characters in the string provide identification of particular features of the vehicle. For example, the make, model, year and colour of the vehicle may be indicated by predetermined characters suitably positioned in the string of the code. It will be appreciated that the NVC code could, itself, be encrypted in the code utilised with this invention.

The system may include a plurality of code reading means, at least certain of the code reading means being portable units. A plurality of such units may be made available to persons normally involved in the checking of vehicles such as the police or traffic officials. Thus, for example, at a road block, personnel manning the road block may be issued with the code reading means for enabling the personnel to check whether or not the vehicle has been stolen and/or illegally modified.

Still further, as indicated above, the code is mounted in a position where it is visible or readable by the relevant authorized personnel. Thus, traffic control personnel, such as, for example, meter maids could be issued with code reading means. Then, with illegally parked or unroadworthy vehicles which are to be ticketed, the traffic control personnel reads the code from the vehicle and the relevant information is automatically printed out on the ticket or docket to be issued. It will be appreciated that this will reduce the likelihood of errors occurring due to manual transcription or completion of the necessary documentation. As a development of this aspect, should the code carried on the vehicle be suitably configured to be read from a distance, it could also be used for recording particulars of vehicles exceeding the speed limit.

The invention is now described by way of example with reference to the accompanying diagrammatic drawings.

DETAILED DESCRIPTION OF THE DRAWINGS

In the drawings

Figure 1:
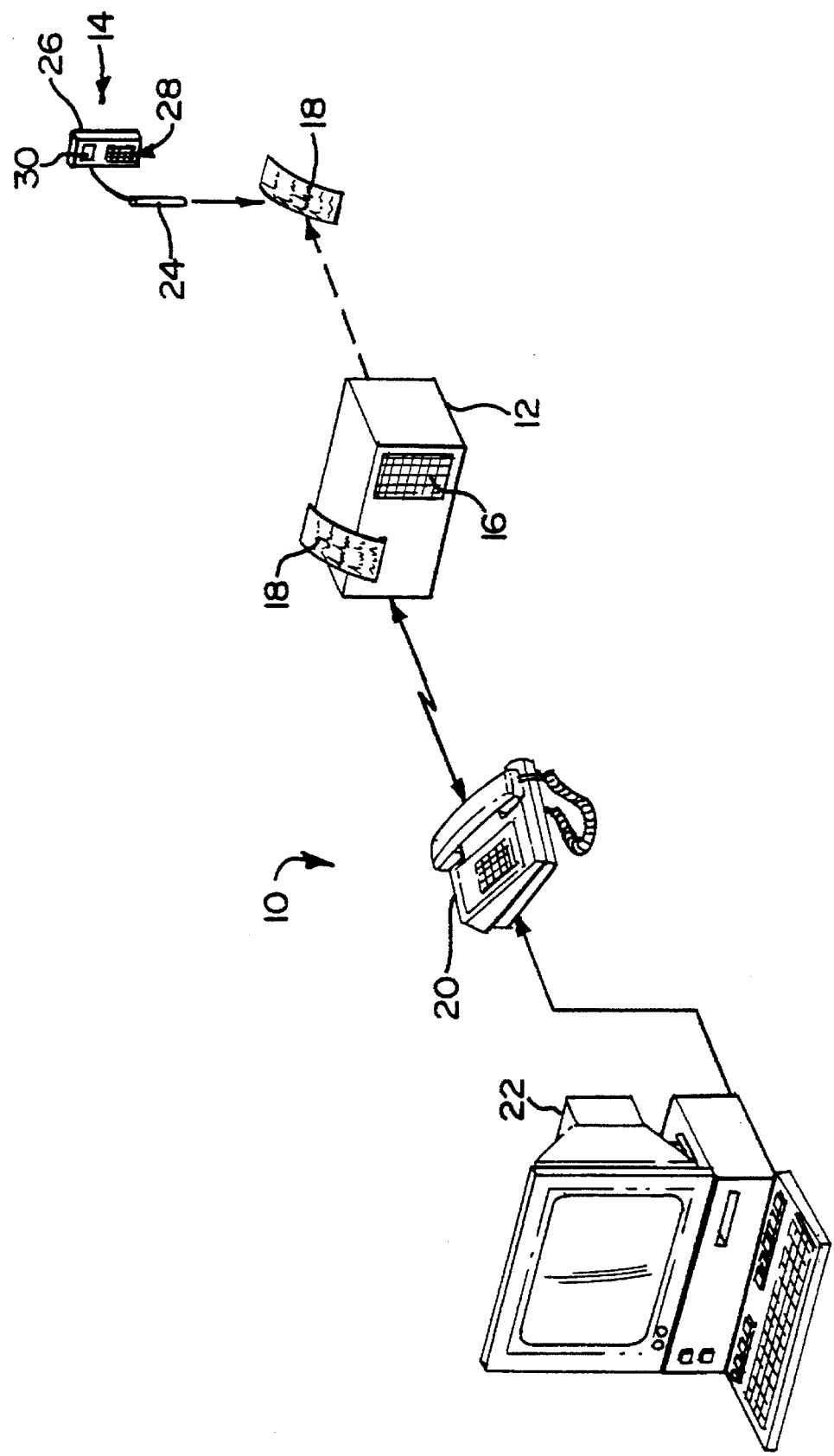
Figure 2:
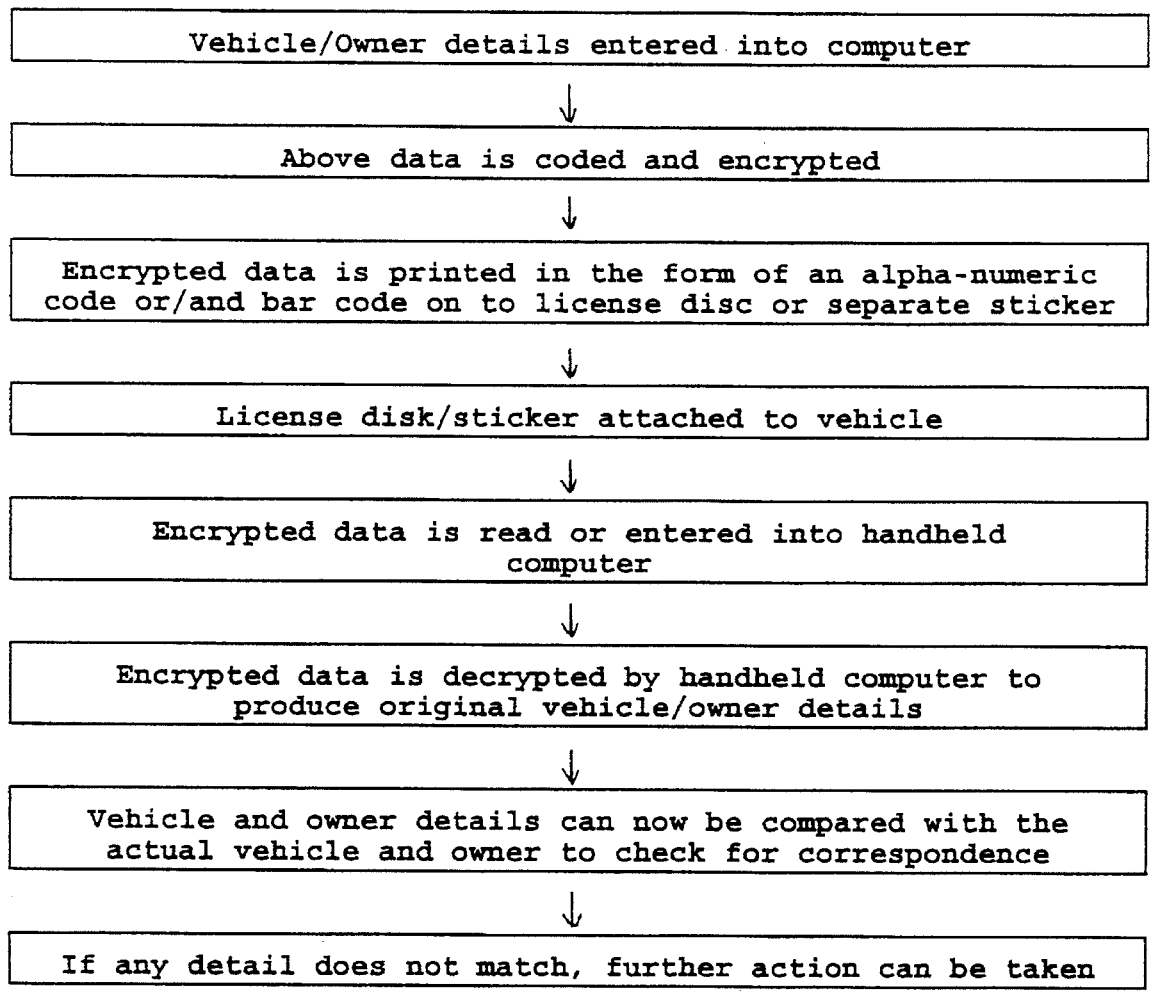

FIG. 1 shows, schematically, a system, in accordance with the invention, for identifying a vehicle; and FIG. 2 shows a flow chart of the operation of the system.

DESCRIPTION OF PREFERRED EMBODIMENT

Referring to the drawing, a system, in accordance with the invention, for identifying a vehicle, is illustrated and is designated generally by the reference numeral 10. The system 10 comprises a code generating means 12 for generating a code in response to the provision of predetermined data representative of characteristics or features of the vehicle. The system 10 further comprises a plurality of code reading means 14 (only one of which is shown) for decrypting the code once it has been attached to the vehicle.

The code generating means 12 is microprocessor-based and includes an entering means in the form of a keypad 16 for entering details of the features of the vehicle by a person requesting the code. The microprocessor of the code generating means 12 includes a crypto-algorithm which encrypts the data and generates the code in a humanly discernible form. The Applicant envisages that the code will be generated on a vehicle licence disc or ticket 18 (hereinafter referred to as a "licence disc") in conjunction with other conventional information relating to the vehicle. However, it will be appreciated that the code could be generated on a separate slip of paper.

As illustrated in the drawing, the code generating means 12 is connected via a modem link 20 to a central database represented by a computer 22. It will, however, be appreciated that the computer 22 could, in most circumstances, function as the code generating means.

The code is in the form of a string of alpha-numeric characters and/or a bar code. Thus, each code reading means 14 includes a bar code reader 24 connected to a portable unit 26. The unit 26 comprises a microprocessor having a crypro-algorithm therein for decrypting a code read by the reader 24. Additionally, the unit 26 includes a keypad 28 and a display 30.

The code generated by the code generating means 12 includes data relating to the make, model, year of registration, year of manufacture, engine number, vehicle identification number (VIN), chassis number, colour, registration number, or the like of the vehicle.

It will be appreciated that the engine number or VIN is normally very long. If the relevant number is encrypted directly into the code, this will result in the code becoming too long. Hence, the engine number and/or VIN are compressed using a suitable data compression technique prior to encrypting it into the code. Then, should a comparison of either number wish to be made, the number to be compared is entered into the unit 26 via the keypad 28. The same data compression technique is carried out on the entered number and the resultant compressed number is then compared with the compressed version of the engine number or VIN decrypted from the code.

Details of these data are encrypted into the code. Additionally, the code includes information relating to a personal identification number (PIN) of the owner or operator of the vehicle or of the vehicle itself. The purpose of the PIN is to enable an authorized user of the vehicle to confirm this fact to police or traffic officials, for example, at a road block. It is not necessary for the PIN to be kept strictly secret or to be memorized by the user of the vehicle as long as it is concealed in the vehicle by the authorized user of the vehicle so that, upon demand, the authorized user is in a position to ascertain what the PIN is relating to that vehicle.

Still further, the code includes information relating to a name of an authorized user or owner of the vehicle. Once again, it is not necessary for an operator of the vehicle to know the exact spelling of the name. The authorized user must merely know the person's name so that it can be provided to the relevant personnel upon demand.

Hence, in use, a person wishing to obtain a licence for his vehicle approaches the licensing authority. When the licence disc is issued, upon the provision of the abovementioned data relating to the features of the vehicle to the person licensing the vehicle, the code is printed either on the licence disc 18 or on the separate slip of paper which is affixable to the vehicle where it is visible externally of the vehicle.

Authorized traffic officials or police, for example, manning road blocks, are each issued with a code reading means 14. When a vehicle is stopped at the road block, the code of the vehicle is scanned using the scanner 24 and the code is displayed on the display 30. The person using the unit 26 can, by entering appropriate prompts via the keypad 28, ascertain details of the vehicle such as the colour etc. from the crypto-algorithm of the unit 26 and can determine that the relevant feature extracted from the code and displayed on the display 30 corresponds with that feature of the vehicle.

It will be appreciated that it often occurs that a vehicle is stolen and it is quite some time before it is reported that the vehicle has been stolen resulting in the officials manning a road block not being timeously notified. To cater for this situation, even if all features of the vehicle should correspond with those of the code read by the scanner 24 of the unit 26, the person using the unit 26 can ask the driver of the vehicle for the PIN. Should the driver be unable to provide the PIN or provide a PIN which does not correspond with that revealed by the decryption of the code, it would provide an indication that the vehicle has been stolen allowing for a more thorough investigation of the matter.

As a further safeguard or precaution, the driver of the vehicle, assuming everything else matches, can be asked for the name of the authorized user or owner of the vehicle. The driver of the vehicle provides details of the name, for example, by spelling the name, to the relevant personnel. Details of the name provided by the driver are entered into the unit 26. A comparison is effected by the unit 26 between the name provided by the driver of the vehicle and the name decrypted from the code. If there is an exact match between the names or a substantial match, this will provide an indication that the driver is authorized to be using the vehicle. Only a substantial match, for example, an 80 percent match, is required to cater for the case where a driver of the vehicle is less than perfectly literate. If there is not the required match between the name provided by the driver and the name decrypted from the code, this will again serve as an indication of improper use of the vehicle allowing for a more thorough investigation of the matter.

Both in respect of the PIN and details of the name, it will be appreciated that it is not necessary for the PIN or the name to be displayed on the display 30 of the unit 26. The unit 26 incorporates a comparator for enabling a comparison to be made and it is only necessary for the acceptance or rejection of the name or the PIN to be displayed on the display 30 of the unit 26.

Hence, it is an advantage of the invention that a system 10 is provided which facilitates rapid identification of vehicles and, particularly, without the need to refer to a central database. It will be appreciated that should any feature of the vehicle not correspond with a feature determined by decryption of the code attached to that vehicle, it would provide reasonable grounds for suspecting that the vehicle has been stolen. Also, as potential thieves would not know how to encrypt the code, it would be poinnless for them to attempt to forge the licence disc 18 or slip of paper or to attempt to remove it and replace it by another disc or slip of paper having some other code.

We claim:

1. A method of identifying a vehicle to verify that a driver is authorized to use the vehicle, the method including the steps of visibly mounting a humanly discernible code on the vehicle;

said code including encrypted data relating to features of said vehicle and encrypted data relating to an identifying means of at least one of the vehicle itself, an owner of the vehicle and an authorized user of the vehicle;

reading said code mounted on the vehicle;

decrypting the code to extract therefrom said data relating to said features of the vehicle and to said identifying means;

comparing said data decrypted from said code with said features of said vehicle to determine whether or not said code applies to said vehicle to which it is attached; and comparing information supplied by a driver of said vehicle with said data decrypted from the code relating to said identifying means to verity that the driver is authorized to use the vehicle.

2. The method as claimed in claim 1 in which the code includes data relating to a personal identification number (PIN) and in which the method includes comparing the PIN given by a driver of the vehicle with the PIN decrypted from the code.

3. The method as claimed in claim 2 which includes effecting a comparison of the PIN decrypted from the code with the PIN provided by the driver and providing an indication of the match of the two PIN's without displaying in any way the PIN decrypted from the code.

4. The method as claimed in claim 2 in which the code includes data relating to a predetermined additional identifying device and in which the method includes comparing the identifying device given by a driver of the vehicle with the identifying device decrypted from the code.

5. The method as claimed in claim 4 which includes effecting a comparison of the identifying device decrypted from the code with the identifying device provided by the driver and providing an indication of the match of the two identifying devices without displaying in any way the name decrypted from the code.

6. The method as claimed in claim 4 which includes, initially, providing the required data relating to the features of the vehicle, the PIN and the predetermined identifying device, encrypting the data into the code and generating the code in a suitable format.

7. The method as claimed in claim 6 which includes compressing at least certain of the data prior to encryption.

8. The method as claimed in claim 6 which includes generating the code as a string of alpha-numeric characters.

9. The method as claimed in claim 6 which includes generating the code in a bar code format.

10. A system for identifying a vehicle to verify that a driver is authorized to use the vehicle, the system including a code-generating means for generating a humanly discernible code in response to the provision of predetermined data relating to at least certain features of said vehicle and for supplying a person with said code, the code-generating means encrypting said data;

said code including data relating to an identifying means of at least one of the vehicle itself, an owner of the vehicle and an authorized user of the vehicle;

means for visibly mounting said code on the vehicle;

a code reading means for reading said code and for decrypting said code to extract therefrom said data relating to said features of said vehicle and of said identifying means and for determining whether or not said code applies to said vehicle to which it is attached; and a comparator for comparing information supplied by a driver of the vehicle with said data relating to the identifying means decrypted from the code to verify that the driver is authorized to use the vehicle.

11. The system as claimed in claim 10 in which the code is in the form of a string of alpha-numeric characters.

12. The system as claimed in claim 10 in which the code is in the form of a bar code.

13. The system as claimed in claim 10 in which the code reading means includes an entering means for entering the code to enable the code to be read and decrypted.

14. The system as claimed in claim 10 in which the features of the vehicle embodied in the code include physical characteristics of the vehicle as well as identifying characteristics of the vehicle.

15. The system as claimed in claim 14 in which the code also embodies data relating to a personal identification number (PIN).

16. The system as claimed in claim 14 in which the code further embodies data relating to an additional identifying device.

17. The system as claimed in claim 16 in which the code reading means includes a microprocessor having a memory means in which a crypro-algorithm is stored for decrypting the code read from the vehicle.

18. The system as claimed in claim 17 in which the microprocessor further includes a comparator or comparing information made available by a driver of the vehicle relating to the PIN and the additional identifying device.

19. The system as claimed in claim 17 in which a display means is connected to the microprocessor for displaying information relating to the features of the vehicle.

20. The system as claimed in claim 10 which includes a plurality of code reading means, at least certain of the code reading means being portable.

* * * * *